US012344008B2

(12) United States Patent
Seino et al.

(10) Patent No.: US 12,344,008 B2

(45) Date of Patent: Jul. 1, 2025

(54) PRINTING UNIT AND PORTABLE TERMINAL

(71) Applicant: Seiko Instruments Inc., Chiba (JP)

(72) Inventors: Takumi Seino, Chiba (JP); Kouhei Miyawaki, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 80 days.

(21) Appl. No.: 18/453,671

(22) Filed: Aug. 22, 2023

(65) Prior Publication Data

US 2024/0075750 A1 Mar. 7, 2024

(30) Foreign Application Priority Data

Sep. 2, 2022 (JP) ................................ 2022-139616

(51) Int. Cl.

*B41J 3/36* (2006.01)
*B41J 2/32* (2006.01)
*B41J 11/04* (2006.01)
*B41J 29/38* (2006.01)

(52) U.S. Cl.

CPC . *B41J 2/32* (2013.01); *B41J 3/36* (2013.01); *B41J 11/04* (2013.01); *B41J 29/38* (2013.01)

(58) Field of Classification Search

CPC ............... B41J 2/32; B41J 3/36; B41J 3/4075
See application file for complete search history.

(56) References Cited

U.S. PATENT DOCUMENTS 9,365,057 B1 6/2016 Seino et al.
2022/0222018 A1* 7/2022 Yoshigi .................. G06F 3/121

FOREIGN PATENT DOCUMENTS

EP 4005808 A1 6/2022
JP 2016-159482 A 9/2016

OTHER PUBLICATIONS

Extended European Search Report in Europe Application No. 23194974.4, dated Dec. 1, 2023, 7 pages.

* cited by examiner

*Primary Examiner* — Scott A Richmond
(74) *Attorney, Agent, or Firm* — Crowell & Moring LLP

(57) ABSTRACT

A printing unit includes: a platen roller configured to convey a recording sheet; a thermal head configured to perform printing on the recording sheet through press contact with an outer peripheral surface of the platen roller; a motor configured to serve as a drive source of the platen roller; and a frame configured to support the platen roller in a rotatable manner, wherein the frame includes: a motor support portion configured to support the motor; a base portion which is connected to the motor support portion, and extends in an axial direction of the platen roller; mounting portions which are attached to a member on which the printing unit is to be mounted; a protruding portion which protrudes from the base portion; and a rib which is provided between the motor support portion and the mounting portions, and extends so as to connect the protruding portion and the base portion to each other, wherein the base portion includes a guide surface configured to guide the recording sheet toward the thermal head, and wherein the guide surface is inclined with respect to a normal direction of a head surface of the thermal head.

7 Claims, 9 Drawing Sheets

PRINTING UNIT AND PORTABLE TERMINAL

RELATED APPLICATIONS

This application claims priority to Japanese Patent Application No. JP2022-139616, filed on Sep. 2, 2022, the entire content of which is incorporated herein by reference.

BACKGROUND OF THE INVENTION

1. Field of the Invention

The present invention relates to a printing unit and a portable terminal.

2. Description of the Related Art

Hitherto, there has been known a printing unit which is configured to perform printing by heating a printing surface of a recording sheet with heating elements of a thermal head to develop a color on the printing surface while feeding the recording sheet through rotation of a platen roller under a state in which the recording sheet is nipped between the platen roller and the thermal head (see, for example, Japanese Patent Application Laid-open No. 2016-159482). This printing unit includes the platen roller, a motor, and a frame. The motor is configured to rotate the platen roller. The frame supports the platen roller in a rotatable manner. The frame includes: a pair of side wall portions which hold both ends of the platen roller, respectively; and a support portion which is provided between the pair of side wall portions. The motor is mounted on one of the side wall portions. Mounting portions are provided to the support portion with an interval in an axial direction of the platen roller. The mounting portions are fastened to a casing of a portable terminal on which the printing unit is mounted.

However, in the related art, when the portable terminal including the printing unit is dropped, inertia of the motor with a relatively heavy weight, which is mounted on the frame, is applied to the frame fixed to the casing, and hence, the frame may be broken. Thus, the related-art printing unit has a room for improvement in durability against a drop impact.

The present disclosure has been made in view of such a circumstance, and an object thereof is to provide a printing unit having excellent durability against a drop impact, and a portable terminal including the printing unit.

SUMMARY OF THE INVENTION

According to one embodiment of the present invention, there is provided a printing unit including: a platen roller configured to convey a recording sheet; a thermal head configured to perform printing on the recording sheet through press contact with an outer peripheral surface of the platen roller; a motor configured to serve as a drive source of the platen roller; and a frame configured to support the platen roller in a rotatable manner, wherein the frame includes: a motor support portion configured to support the motor; a base portion which is connected to the motor support portion, and extends in an axial direction of the platen roller; mounting portions which are attached to a member on which the printing unit is to be mounted; a protruding portion which protrudes from the base portion; and a rib which is provided between the motor support portion and the mounting portions, and extends so as to connect the protruding portion and the base portion to each other, wherein the base portion includes a guide surface configured to guide the recording sheet toward the thermal head, and wherein the guide surface is inclined with respect to a normal direction of a head surface of the thermal head.

In the above-mentioned thermal printer according to the one embodiment of the present invention, wherein the protruding portion is connected to the motor support portion.

In the above-mentioned thermal printer according to the one embodiment of the present invention, wherein the protruding portion is one of the mounting portions.

In the above-mentioned thermal printer according to the one embodiment of the present invention, wherein the mounting portions are fastened to the member on which the printing unit is to be mounted.

In the above-mentioned thermal printer according to the one embodiment of the present invention, wherein the mounting portions include a first mounting portion and a second mounting portion which are arranged with an interval in the axial direction, wherein the first mounting portion is provided closer to the motor support portion than the second mounting portion is, and wherein the second mounting portion is provided at an end portion of the frame, which is on a side opposite to the motor support portion with respect to the first mounting portion.

In the above-mentioned thermal printer according to the one embodiment of the present invention, wherein an inclination angle of the guide surface with respect to the normal direction of the head surface of the thermal head is 45° or more and 60° or less.

According to one embodiment of the present invention, there is provided a portable terminal including the above printing unit.

DETAILED DESCRIPTION OF THE PREFERRED EMBODIMENTS

Now, an embodiment of the present invention is described with reference to the drawings. In the following description, components having the same or similar function are denoted by the same reference symbols. In some cases, overlapping description of the components is omitted.

Figure 1:
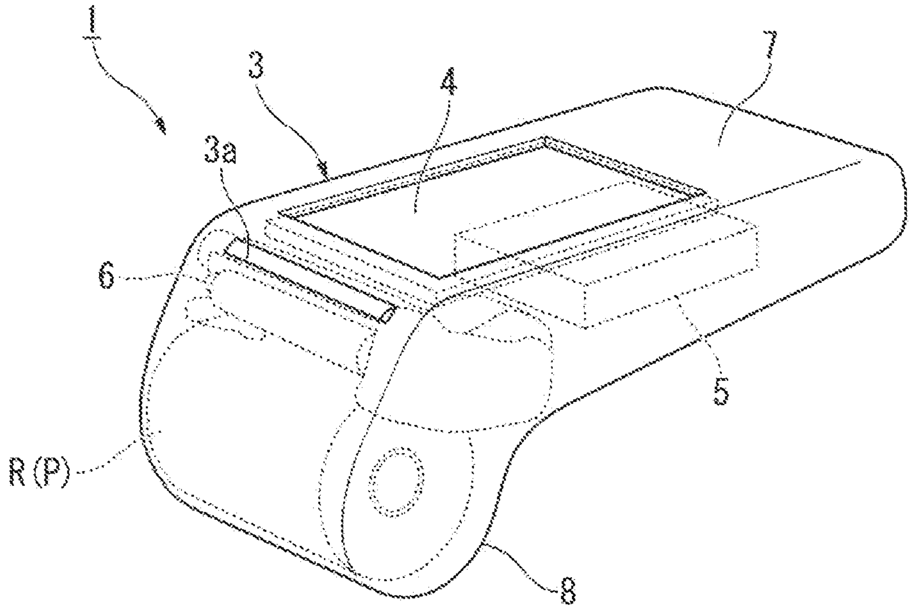
FIG. 1 is a perspective view for illustrating a portable terminal according to at least one embodiment of the present invention.

FIG. 1 is a perspective view for illustrating a portable terminal according to at least one embodiment of the present invention.

As illustrated in FIG. 1, a portable terminal 1 is capable of performing printing on a recording sheet P. The recording sheet P is a heat sensitive sheet that develops a color when heat is applied thereto, and is used suitably for printing a variety of labels, receipts, and tickets. The recording sheet P is set in the portable terminal 1 in a state of a roll sheet R obtained by rolling the recording sheet P so as to have a hollow hole, and printing is performed on a part drawn from the roll sheet R.

The portable terminal 1 includes a casing 3, a display unit 4, a control unit 5, and a printing unit 6.

The casing 3 formed into a hollow box-shape is made of a metal material or plastic such as ABS or a composite material of ABS and polycarbonate. The casing 3 includes a main body portion 7 having a rectangular parallelepiped shape, and a roll sheet receiving portion 8 formed at one end portion of the main body portion 7 in a longitudinal direction thereof so as to be bent toward one side of a thickness direction of the main body portion 7. The printing unit 6 is received at the one end portion of the main body portion 7 in the longitudinal direction. A discharge port 3*a* is formed in one end surface of the main body portion 7 in the longitudinal direction. The discharge port 3*a* is configured to discharge the recording sheet P printed by passing through the printing unit 6. The display unit 4 is arranged on a main surface of the main body portion 7, which faces the other side in the thickness direction. The display unit 4 is, for example, a liquid crystal panel. The display unit 4 is connected to the control unit 5, and is configured to display various kinds of information. The roll sheet receiving portion 8 is configured to receive the roll sheet R. The printing unit 6 is a so-called thermal printer.

Figure 2:
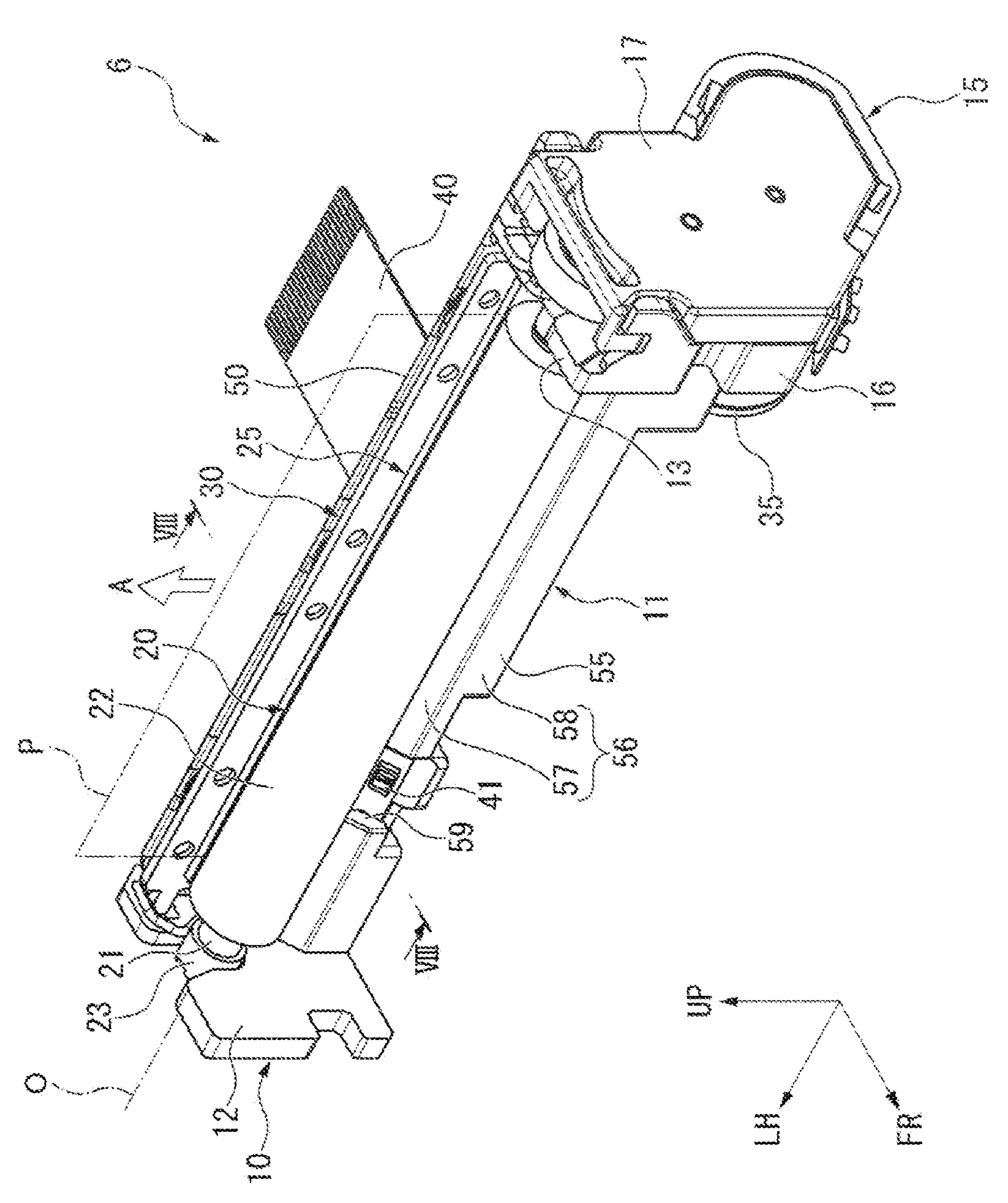
FIG. 2 is a perspective view for illustrating a printing unit according to the embodiment when viewed from an upper front side thereof.
Figure 3:
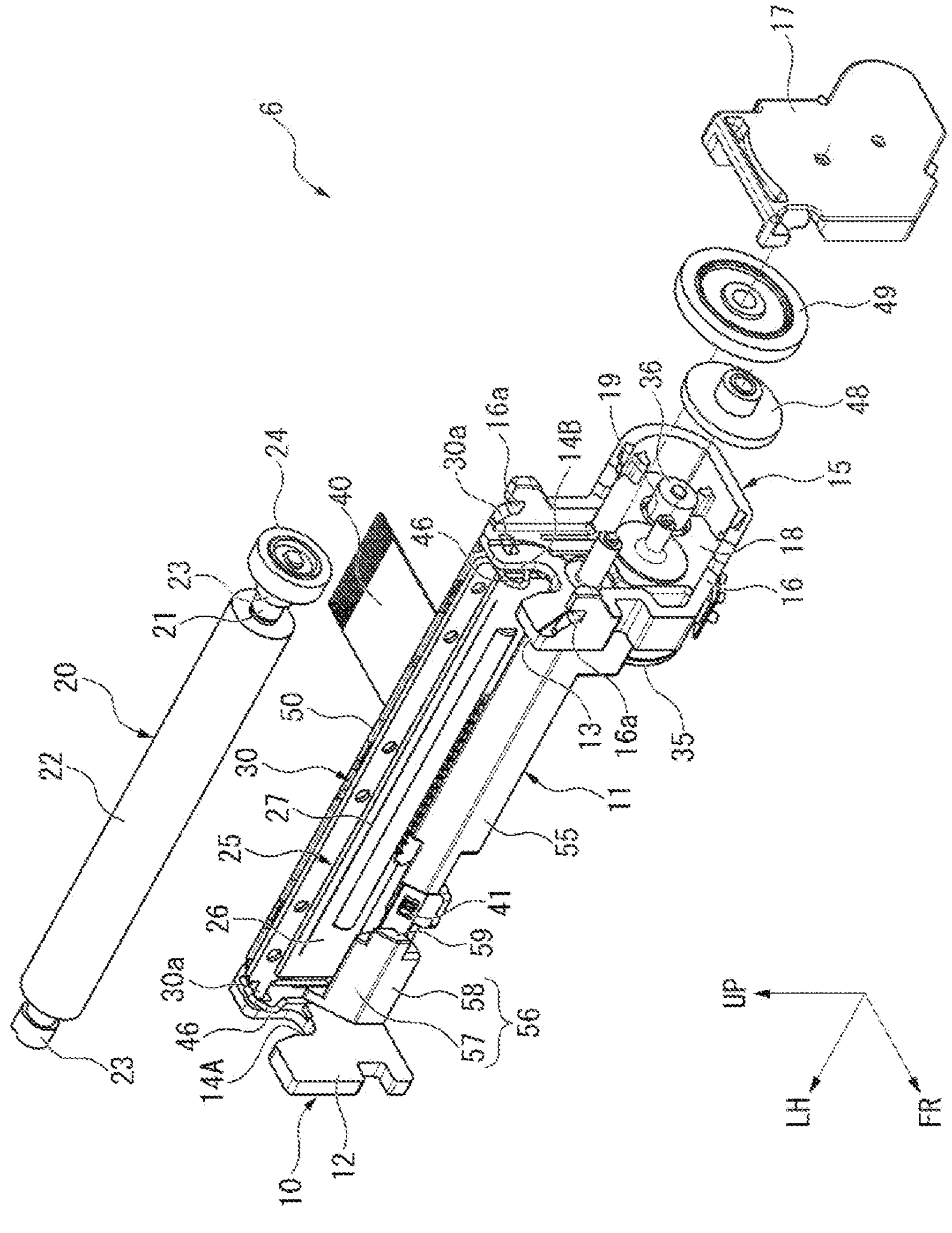
FIG. 3 is an exploded perspective view for illustrating the printing unit according to the embodiment when viewed from the upper front side.
Figure 4:
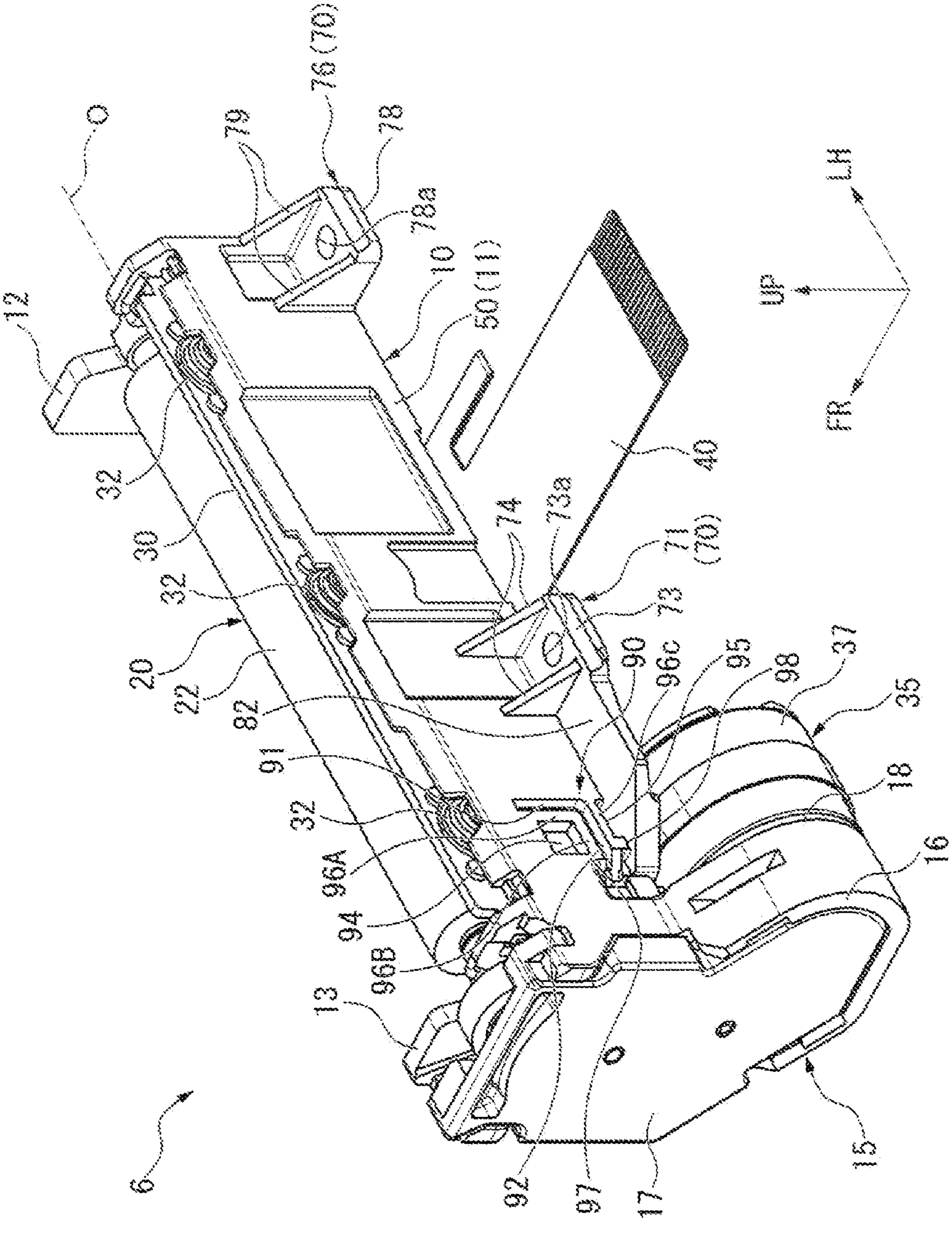
FIG. 4 is a perspective view for illustrating the printing unit according to the embodiment when viewed from an upper rear side thereof.

FIG. 2 is a perspective view for illustrating the printing unit according to the embodiment when viewed from an upper front side thereof. FIG. 3 is an exploded perspective view for illustrating the printing unit according to the embodiment when viewed from the upper front side. FIG. 4 is a perspective view for illustrating the printing unit according to the embodiment when viewed from an upper rear side thereof.

As illustrated in FIG. 2 to FIG. 4, the printing unit 6 includes a platen roller 20, a thermal head 25, a head support plate 30, a motor 35, a flexible printed board 40, and a frame 10. The platen roller 20 conveys the recording sheet P. The thermal head 25 performs printing on the recording sheet P through press contact with an outer peripheral surface of the platen roller 20. The head support plate 30 is arranged on a side opposite to the platen roller 20 across the thermal head 25 and supports the thermal head 25. The motor 35 serves as a drive source of the platen roller 20. The flexible printed board 40 electrically connects the control unit 5 of the portable terminal 1 and each of parts of the printing unit 6 to each other. The frame 10 supports the platen roller 20 and the head support plate 30.

As illustrated in FIG. 2, the printing unit 6 is configured to convey the recording sheet P passing between the platen roller 20 and the thermal head 25, in a direction indicated by an arrow A. Mainly in the description for the printing unit 6 below, a direction along the arrow A is defined as a vertical direction, and the direction indicated by the arrow A is defined as an upper side. Further, a direction which is orthogonal to the vertical direction and matches an axial direction of the platen roller 20 is defined as a horizontal direction. In addition, a direction orthogonal to the vertical direction and the horizontal direction is defined as a fore-and-aft direction, and the platen roller 20 side with respect to the thermal head 25 in the fore-and-aft direction is defined as a front side. A left side and a right side each correspond to a direction when viewed from the front side. In the drawings used for the following description, an arrow UP indicates an upper side, an arrow FR indicates a front side, and an arrow LH indicates a left side.

As illustrated in FIG. 3, the frame 10 is formed of, for example, a plate member such as a polycarbonate resin containing glass fibers. The frame 10 is formed into a U-shape opened toward the front side when viewed in the vertical direction. Specifically, the frame 10 includes a base portion 11 extending in the horizontal direction, a first side wall portion 12 protruding from a left end portion of the base portion 11 to the front side, and a second side wall portion 13 protruding from a right end portion of the base portion 11 to the front side and a lower side.

As illustrated in FIG. 3 and FIG. 4, the base portion 11 is arranged between the first side wall portion 12 and the second side wall portion 13. The base portion 11 includes: a rear plate portion 50 arranged on a side opposite to the platen roller 20 across the head support plate 30; and a sheet guide portion 55 arranged in front of the rear plate portion 50. The rear plate portion 50 is formed into a plate shape having a thickness in the fore-and-aft direction. The rear plate portion 50 is connected to the first side wall portion 12 and the second side wall portion 13. The rear plate portion 50 extends in the horizontal direction between the first side wall portion 12 and the second side wall portion 13. A lower end portion of the rear plate portion 50 extends in the horizontal direction. The sheet guide portion 55 is connected to the first side wall portion 12 and the second side wall portion 13. The sheet guide portion 55 extends in the horizontal direction between the first side wall portion 12 and the second side wall portion 13. A lower end portion of the sheet guide portion 55 extends in the horizontal direction at the same position as that of the lower end portion of the rear plate portion 50 in the vertical direction.

Figure 5:
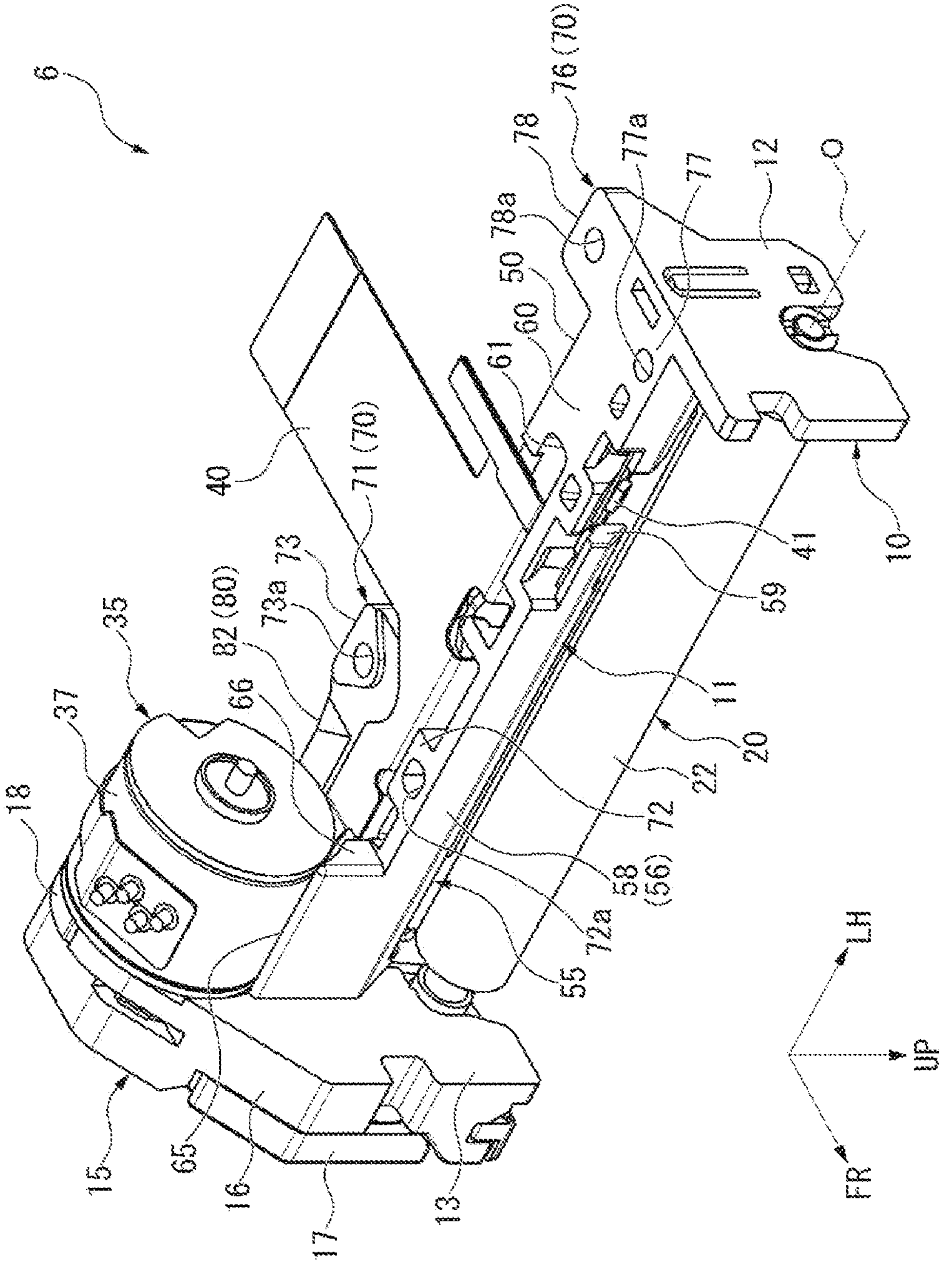
FIG. 5 is a perspective view for illustrating the printing unit according to the embodiment when viewed from a lower front side thereof.
Figure 6:
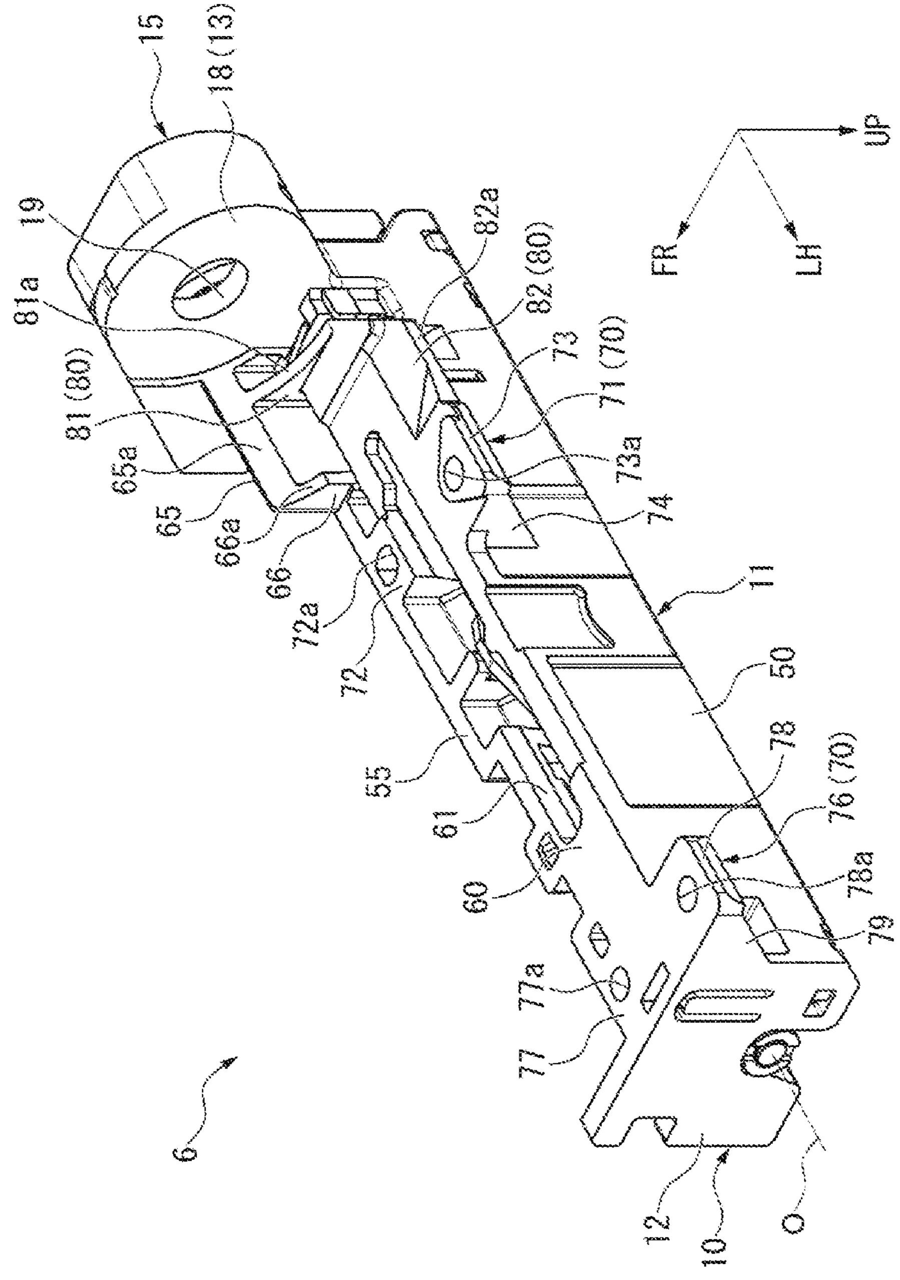
FIG. 6 is a perspective view for illustrating the printing unit according to the embodiment when viewed from a lower rear side thereof.

FIG. 5 is a perspective view for illustrating the printing unit according to the embodiment when viewed from a lower front side thereof. FIG. 6 is a perspective view for illustrating the printing unit according to the embodiment when viewed from a lower rear side thereof. FIG. 6 is an illustration of a state in which the motor 35 and the flexible printed board 40 are removed.

As illustrated in FIG. 5 and FIG. 6, the base portion 11 includes a connection portion 60 connecting the rear plate portion 50 and the sheet guide portion 55 to each other. The connection portion 60 connects the respective lower end portions of the rear plate portion 50 and the sheet guide portion 55 to each other, and extends in the horizontal direction. An intermediate portion of the connection portion 60 in the horizontal direction has an insertion hole 61 through which the flexible printed board 40 is to be inserted. The insertion hole 61 extends through the connection portion 60 in the vertical direction and communicates with a space between the rear plate portion 50 and the sheet guide portion 55.

As illustrated in FIG. 3, the first side wall portion 12 is formed into a plate shape having a thickness in the horizontal direction. An upper edge of the first side wall portion 12 is cut downward to form a first roller insertion groove 14A. The second side wall portion 13 is formed into a plate shape having a thickness in the horizontal direction. An upper edge of the second side wall portion 13 is cut downward to form a second roller insertion groove 14B. The first roller insertion groove 14A and the second roller insertion groove 14B are formed so as to match each other when viewed in the horizontal direction. The platen roller 20 is removably inserted into the first roller insertion groove 14A and the second roller insertion groove 14B.

A gearbox portion 15 is formed on an outer side of the second side wall portion 13. The gearbox portion 15 includes a peripheral wall portion 16 formed to extend upright from a peripheral edge of the second side wall portion 13 toward the outer side in the horizontal direction. That is, the gearbox portion 15 is formed of the second side wall portion 13 and the peripheral wall portion 16, and is opened toward the outer side in the horizontal direction. The peripheral wall portion 16 is opened upward when viewed in the horizontal direction. The peripheral wall portion 16 includes a pair of locking recessed portions 16*a* formed so as to be recessed downward. The pair of locking recessed portions 16*a* is formed on both front and rear sides of an upper opening of the peripheral wall portion 16, respectively. A gear cover 17 is engaged with the pair of locking recessed portions 16*a*. The gear cover 17 covers an inner side of the gearbox portion 15 from an outer side thereof in the horizontal direction.

A first reduction gear 48 and a second reduction gear 49 are assembled inside the gearbox portion 15 so as to be rotatable. The first reduction gear 48 and the second reduction gear 49 meshes with each other.

As illustrated in FIG. 5 and FIG. 6, the second side wall portion 13 includes a motor support portion 18 supporting the motor 35. The motor support portion 18 is connected to the base portion 11. The motor support portion 18 extends downward from a portion connected to the base portion 11. The motor support portion 18 is formed so as to be arranged on a side opposite to the platen roller 20 across the sheet guide portion 55 when viewed in the horizontal direction. An inner surface of the motor support portion 18 in the horizontal direction serves as a bonding surface to which the motor 35 is to be bonded, and is a flat surface orthogonal to the horizontal direction. The motor support portion 18 has a through-hole 19 through which an output shaft 36 (see FIG. 3) of the motor 35 is to be inserted. The through-hole 19 is a circular hole having a center on an output axis of the motor 35.

As illustrated in FIG. 3, the motor 35 is arranged so that the output axis thereof is parallel to a rotation axis O (see FIG. 2) of the platen roller 20. The motor 35 is arranged on the side opposite to the platen roller 20 across the sheet guide portion 55. The motor 35 is bonded to the motor support portion 18 (see FIG. 6). The output shaft 36 of the motor 35 penetrates through the second side wall portion 13. The output shaft 36 meshes with the first reduction gear 48 inside the gearbox portion 15. A housing 37 (see FIG. 4) of the motor 35 is provided with a cylindrical boss (not shown) which is to be inserted into the through-hole 19 of the motor support portion 18. Through contact of the cylindrical boss with an inner peripheral surface of the through-hole 19 of the motor support portion 18, the motor 35 is non-displaceable relative to the motor support portion 18 in the vertical direction and the fore-and-aft direction. The flexible printed board 40 is connected to the motor 35. The motor 35 is electrically connected to the control unit 5 (see FIG. 1) via the flexible printed board 40. The motor 35 is configured to be driven based on a signal from the control unit 5.

The thermal head 25 is configured to perform printing on the recording sheet P (see FIG. 2). The thermal head 25 is formed into a rectangular shape having its longitudinal direction defined as the horizontal direction when viewed in the fore-and-aft direction. The thermal head 25 includes a head surface 26 and is arranged under a state in which a normal direction of the head surface 26 matches the fore-and-aft direction. The head surface 26 of the thermal head 25 faces to a side opposite to the rear plate portion 50 (to the front side). On the head surface 26 of the thermal head 25, a large number of heating elements 27 are arrayed in the horizontal direction.

The head surface 26 is opposed to a printing surface of the recording sheet P, and the recording sheet P may be nipped between the head surface 26 and the outer peripheral surface of the platen roller 20. The thermal head 25 is connected to the control unit 5 (see FIG. 1) through intermediation of the flexible printed board 40. A driver IC (not shown) mounted on the thermal head 25 is configured to control heat generation of the heating elements 27 based on the signal from the control unit 5. Through the control of the heat generation of the heating elements 27, the thermal head 25 prints, for example, various kinds of letters and figures on the printing surface of the recording sheet P. The thermal head 25 is fixed to the head support plate 30 by being bonded thereunto.

The head support plate 30 is arranged between the rear plate portion 50 and the sheet guide portion 55. The head support plate 30 is made of a metal material. The head support plate 30 is a plate-like member extending in the horizontal direction between the first side wall portion 12 and the second side wall portion 13. The head support plate 30 is arranged under a state in which a thickness direction of the head support plate 30 matches the fore-and-aft direction. The thermal head 25 is held on a front surface of the head support plate 30.

A pair of stoppers 30*a* configured to regulate a pivot range of the head support plate 30 are formed at an upper end portion of the head support plate 30. Each of the pair of stoppers 30*a* is formed in substantially a quadrangular prism shape and extends outward in the horizontal direction of the head support plate 30. The pair of stoppers 30*a* are respectively inserted into a hole portion having a rectangular shape formed in an upper part of the first side wall portion 12 and a hole portion having a rectangular shape formed in an upper part of the second side wall portion 13 in the frame 10. The stoppers 30*a* are movable inside the hole portions, respectively, along with the pivot of the head support plate 30, and may be brought into contact with inner wall surfaces of the hole portions, respectively. Through the contact of the stoppers 30*a* with the inner wall surfaces of the hole portions, the pivot amount of the head support plate 30 is regulated.

As illustrated in FIG. 4, elastic members 32 are interposed between the head support plate 30 and the rear plate portion 50. The elastic members 32 are configured to urge the head support plate 30 and the rear plate portion 50 in a direction of separating the head support plate 30 and the rear plate portion 50 from each other. That is, the elastic members 32 are configured to always press the head support plate 30 toward the front side. A plurality of (three in this embodiment) elastic members 32 are arrayed with intervals in the horizontal direction.

Figure 7:
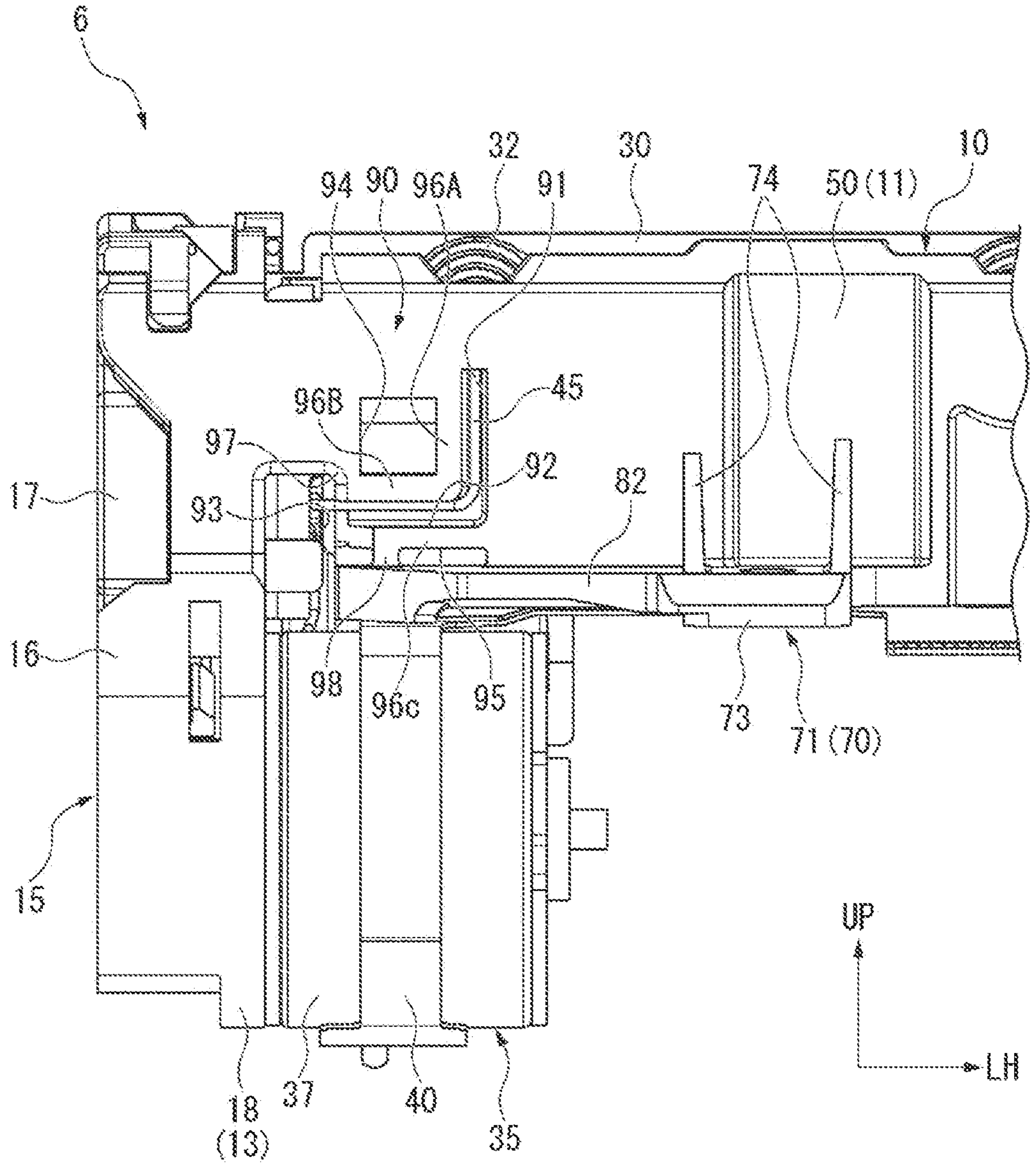
FIG. 7 is a rear view for illustrating a right half of the printing unit according to the embodiment.

FIG. 7 is a rear view for illustrating a right half of the printing unit according to the embodiment.

As illustrated in FIG. 7, the head support plate 30 is electrically conducted to the housing 37 of the motor 35 via a conducting member 45. The conducting member 45 is made of a material having conductivity. In this embodiment, the conducting member 45 is formed of a metal wire. The conducting member 45 is electrically connected to the head support plate 30. The conducting member 45 is mechanically and electrically connected to one of the elastic members 32, and is electrically connected to the head support plate 30 via the one of the elastic members 32. In this embodiment, the conducting member 45 is connected to the elastic member 32 arranged on a rightmost side among the plurality of elastic members 32. The conducting member 45 may be integrated with the elastic member 32. The conducting member 45 penetrates through the rear plate portion 50 and extends from a front space of the rear plate portion 50 to a rear space of the rear plate portion 50. The conducting member 45 is brought into contact with the housing 37 of the motor 35 in a space below the base portion 11.

As illustrated in FIG. 2, the platen roller 20 is arranged so as to be opposed to the thermal head 25 under a state in which the rotation axis O matches the horizontal direction. The platen roller 20 is rotated about the rotation axis O under a state in which the recording sheet P is nipped between the platen roller 20 and the thermal head 25, to thereby convey the recording sheet P in the direction indicated by the arrow A.

As illustrated in FIG. 3, the platen roller 20 includes a roller shaft 21, a roller main body 22 mounted on the roller shaft 21, and a pair of bearings 23 mounted at both ends of the roller shaft 21. The roller shaft 21 is formed slightly longer than the separation distance between the first side wall portion 12 and the second side wall portion 13 of the frame 10. The roller main body 22 is made of, for example, rubber, and is arranged along the horizontal direction uniformly over the entire region excluding portions corresponding to both the ends of the roller shaft 21.

As illustrated in FIG. 2 and FIG. 3, the pair of bearings 23 are inserted into the first roller insertion groove 14A and the second roller insertion groove 14B of the frame 10, respectively. The bearings 23 are held in the first roller insertion groove 14A and the second roller insertion groove 14B by locking springs 46 supported on the frame 10. With this configuration, the platen roller 20 is held so as to be rotatable relative to the frame 10. Further, when the locking springs 46 are elastically deformed in order to insert and remove the bearings 23 into and from the first roller insertion groove 14A and the second roller insertion groove 14B, the platen roller 20 is mountable to and removable from the frame 10. Under a state in which the platen roller 20 is inserted into the first roller insertion groove 14A and the second roller insertion groove 14B, the platen roller 20 is arranged so that the roller main body 22 is brought into contact with the thermal head 25 through intermediation of the recording sheet P drawn out from the roll sheet R (see FIG. 1).

As illustrated in FIG. 3, a driven gear 24 is fixed on the platen roller 20. The driven gear 24 is assembled to an upper part of the gearbox portion 15 when the platen roller 20 is held on the first side wall portion 12 and the second side wall portion 13. The driven gear 24 meshes with the second reduction gear 49. With this, a rotational driving force from the motor 35 is reduced by the first reduction gear 48 and the second reduction gear 49, and then transmitted to the driven gear 24. The platen roller 20 is rotated under a state of being held on the first side wall portion 12 and the second side wall portion 13, thereby being capable of conveying the recording sheet P (see FIG. 2).

The flexible printed board 40 electrically connects between the control unit 5 of the portable terminal 1 and the thermal head 25, the motor 35, and a sensor 41 described later through a wiring pattern formed on the flexible printed board 40. The flexible printed board 40 is connected to the thermal head 25 between the rear plate portion 50 and the sheet guide portion 55 on the frame 10. The flexible printed board 40 extends from a portion connected to the thermal head 25 toward the lower side of the frame 10 through the insertion hole 61 of the connection portion 60 of the frame 10 (see FIG. 5).

The sensor 41 is mounted on the flexible printed board 40. The sensor 41 is configured to detect the recording sheet P which is being moved toward the thermal head 25 while being guided by a guide surface 56 described later. The sensor 41 is, for example, a reflection PI sensor. The sensor 41 is configured such that a light emitted from a light emitting portion is reflected by the recording sheet P so that the reflected light can be detected by a light receiving portion. For example, when a reflected light having a predetermined intensity is detected by the light receiving portion of the sensor 41, the control unit 5 of the portable terminal 1 determines that the recording sheet P is present within a detection range of the sensor 41.

The frame 10 is described in detail.

The sheet guide portion 55 is formed into a columnar shape extending along the horizontal direction. The sheet guide portion 55 includes the guide surface 56 which is configured to guide, toward the thermal head 25, the recording sheet P drawn out from the roll sheet R (see FIG. 1) in front of the printing unit 6. The entire guide surface 56 extends downward and forward from an upper edge, which is closer to the thermal head 25, of the sheet guide portion 55, and faces a space in front of the printing unit 6. Specifically, the guide surface 56 includes: a first guide surface 57 extending forward and downward from the upper edge of the sheet guide portion 55; and a second guide surface 58 extending downward from a front edge of the first guide surface 57. Each of the first guide surface 57 and the second guide surface 58 is a flat surface extending in the horizontal direction.

Figure 8:
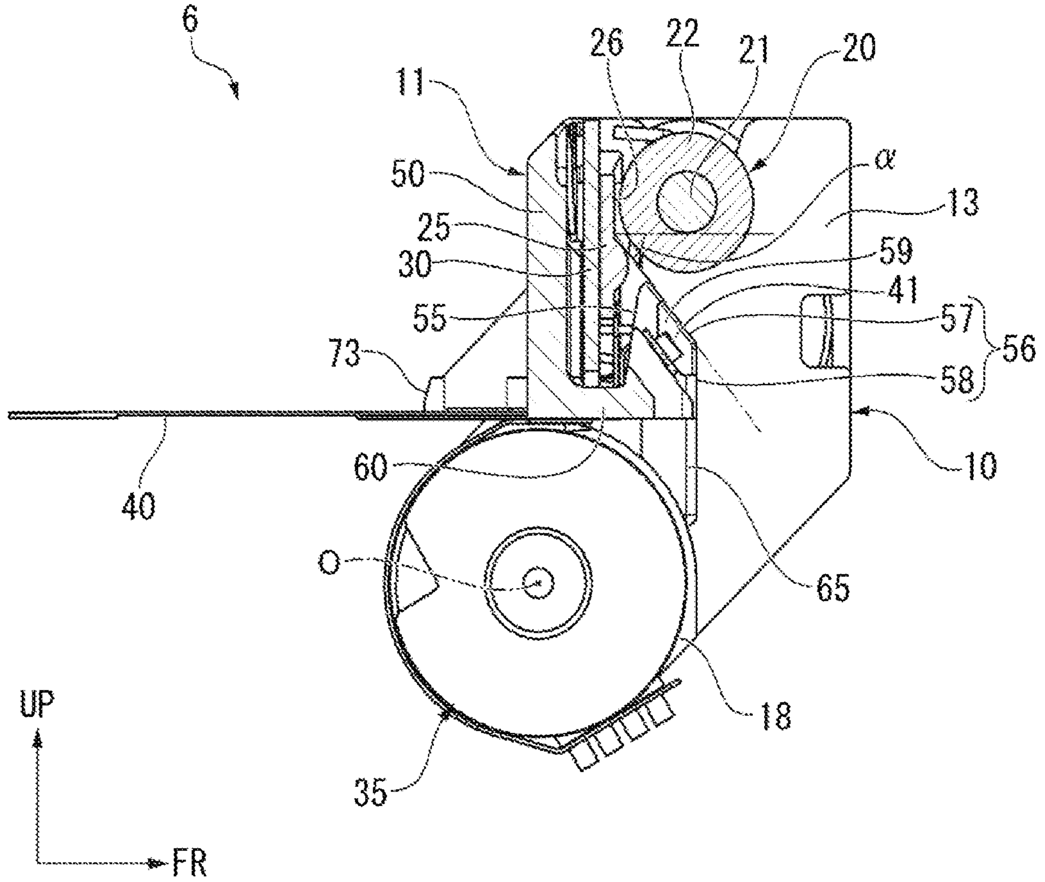
FIG. 8 is a sectional view taken along the line VIII-VIII of FIG. 2.

FIG. 8 is a sectional view taken along the line VIII-VIII of FIG. 2.

As illustrated in FIG. 8, it is desired that the first guide surface 57 be inclined in an angle range of 45° or more and 60° or less with respect to the normal direction of the head surface 26 of the thermal head 25. In this embodiment, the first guide surface 57 is inclined at 52.5° with respect to the normal direction of the head surface 26 of the thermal head 25. That is, in a section orthogonal to the horizontal direction, an angle "$\alpha$" formed by a tangent of the first guide surface 57 and a normal of the head surface 26 of the thermal head 25 is 52.5°. A rear surface of the sheet guide portion 55 is continuous to a rear edge of the first guide surface 57. A lower surface of the sheet guide portion 55 is continuous to a lower edge of the second guide surface 58.

As illustrated in FIG. 3, an accommodation portion 59 for accommodating the sensor 41 is formed in the sheet guide portion 55. The accommodation portion 59 is formed into a recessed shape opened to the guide surface 56. Further, the accommodation portion 59 is opened over the rear surface and the lower surface of the sheet guide portion 55 from the guide surface 56.

Figure 9:
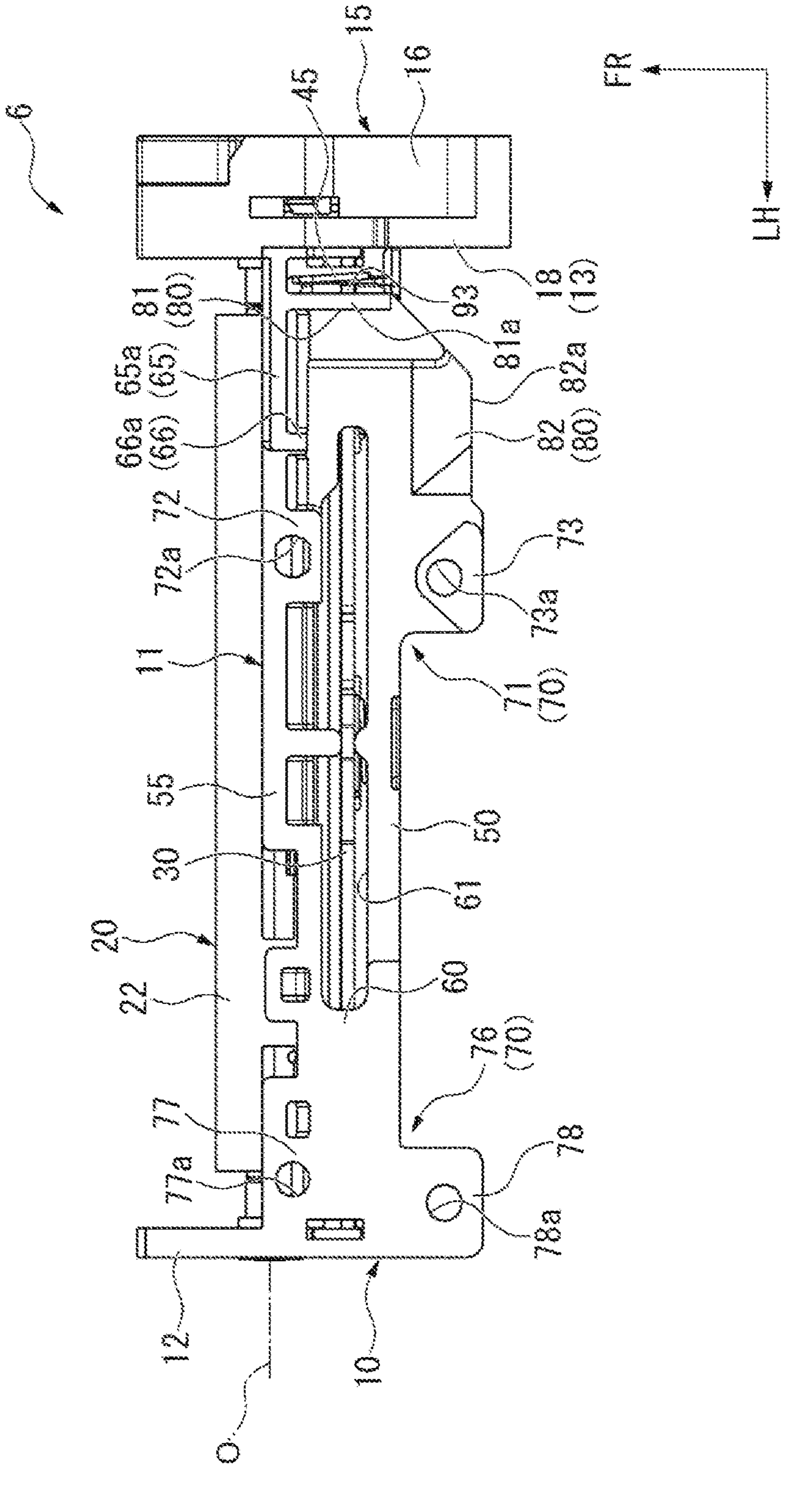
FIG. 9 is a bottom view for illustrating the printing unit according to the embodiment.

FIG. 9 is a bottom view for illustrating the printing unit according to the embodiment. Note that, FIG. 9 is an illustration of a state in which the motor 35 and the flexible printed board 40 are removed.

As illustrated in FIG. 6 and FIG. 9, the frame 10 includes mounting portions 70 which are to be attached to the casing 3 serving as a member on which the printing unit 6 is to be mounted. The mounting portions 70 includes a right-side mounting portion 71 (first mounting portion) and a left-side mounting portion 76 (second mounting portion) which are arranged with an interval in the horizontal direction.

The right-side mounting portion 71 is provided closer to the motor support portion 18 than the left-side mounting portion 76 is (that is, on the right side of the left-side mounting portion 76). The right-side mounting portion 71 is provided on the second side wall portion 13 side from an intermediate position in the horizontal direction between the first side wall portion 12 and the second side wall portion 13. The right-side mounting portion 71 is provided within a formation range of the insertion hole 61 in the horizontal direction. The right-side mounting portion 71 includes a right-side positioning portion 72 and a right-side fastening portion 73.

The right-side positioning portion 72 is provided in the sheet guide portion 55. The right-side positioning portion 72 has a right-side positioning recessed portion 72*a* into which a first positioning pin (not shown) of the casing 3 is to be inserted. The right-side positioning recessed portion 72*a* is opened to the lower surface of the sheet guide portion 55. The opening of the right-side positioning recessed portion 72*a* has an elliptical shape with its longitudinal direction defined as the horizontal direction. The right-side positioning recessed portion 72*a* may extend through the frame 10.

The right-side fastening portion 73 is provided on a rear side of the right-side positioning portion 72. The right-side fastening portion 73 protrudes rearward with a constant width from the lower end portion of the rear plate portion 50. The right-side fastening portion 73 has a right-side fastening hole 73*a* through which a fastening member for fastening to the casing 3 is to be inserted. The right-side fastening hole 73*a* extends through the right-side fastening portion 73 in the vertical direction. At least a part of a formation range of the right-side fastening hole 73*a* in the horizontal direction overlaps a formation range of the right-side positioning recessed portion 72*a* in the horizontal direction.

As illustrated in FIG. 4, a pair of reinforcement ribs 74 are connected to the right-side fastening portion 73. The reinforcement ribs 74 each connect an upper surface of the right-side fastening portion 73 and a rear surface of the rear plate portion 50 to each other. The reinforcement ribs 74 each extend rearward with a constant thickness from the rear surface of the rear plate portion 50. The pair of reinforcement ribs 74 are arranged with an interval from each other in the horizontal direction such that the right-side fastening hole 73*a* is located therebetween. The pair of reinforcement ribs 74 are connected to right and left end portions of the right-side fastening portion 73, respectively. Each of the reinforcement ribs 74 is formed into a right triangle when viewed in a thickness direction of the reinforcement ribs 74 (in the horizontal direction), and two sides forming a right angle in the right triangle are connected to the rear plate portion 50 and the right-side fastening portion 73, respectively. The reinforcement ribs 74 are each connected to the entire right-side fastening portion 73 in the fore-and-aft direction.

As illustrated in FIG. 6 and FIG. 9, the left-side mounting portion 76 is provided at an end portion (left end portion) of the frame 10, which is on a side opposite to the motor support portion 18 with respect to the right-side mounting portion 71. The left-side mounting portion 76 is provided outside the formation range of the insertion hole 61 in the horizontal direction. The left-side mounting portion 76 includes a left-side positioning portion 77 and a left-side fastening portion 78.

The left-side positioning portion 77 is provided at a left end portion of the sheet guide portion 55. The left-side positioning portion 77 has a left-side positioning recessed portion 77*a* into which a second positioning pin (not shown) of the casing 3 is to be inserted. The left-side positioning recessed portion 77*a* is opened to the lower surface of the sheet guide portion 55. The opening of the left-side positioning recessed portion 77*a* has a circular shape. The left-side positioning recessed portion 77*a* may extend through the frame 10.

The left-side fastening portion 78 is provided on a rear side of the left-side positioning portion 77. The left-side fastening portion 78 is arranged with an interval from the right-side fastening portion 73 in the horizontal direction. The left-side fastening portion 78 is provided at the left end portion of the sheet guide portion 55. The left-side fastening portion 78 protrudes rearward with a constant width from a lower end portion of the left end portion of the rear plate portion 50. The left-side fastening portion 78 has a left-side fastening hole 78*a* through which a fastening member for fastening to the casing 3 is to be inserted. The left-side fastening hole 78*a* extends through the left-side fastening portion 78 in the vertical direction. At least a part of a formation range of the left-side fastening hole 78*a* in the horizontal direction overlaps a formation range of the left-side positioning recessed portion 77*a* in the horizontal direction.

As illustrated in FIG. 4, a pair of reinforcement ribs 79 are connected to the left-side fastening portion 78. The reinforcement ribs 79 each connect an upper surface of the left-side fastening portion 78 and the rear surface of the rear plate portion 50 to each other. The reinforcement ribs 79 each extend rearward with a constant thickness from the rear surface of the rear plate portion 50. The pair of reinforcement ribs 79 are arranged with an interval from each other in the horizontal direction such that the left-side fastening hole 78*a* is located therebetween. The pair of reinforcement ribs 79 are connected to right and left end portions of the left-side fastening portion 78, respectively. Each of the reinforcement ribs 79 is formed into a right triangle when viewed in a thickness direction of the reinforcement ribs 79 (in the horizontal direction), and two sides forming a right angle in the right triangle are connected to the rear plate portion 50 and the left-side fastening portion 78, respectively. The reinforcement ribs 79 are each connected to the entire left-side fastening portion 78 in the fore-and-aft direction. The reinforcement rib 79 on the left side is provided so as to extend the first side wall portion 12.

As illustrated in FIG. 6, the frame 10 further includes a standing wall 65 and ribs 80.

The standing wall 65 protrudes downward from the sheet guide portion 55. The standing wall 65 is provided so as to overlap the housing 37 of the motor 35 when viewed from the front side, and covers an outer periphery of the motor 35 (see FIG. 5). The standing wall 65 is provided closer to the motor support portion 18 than the right-side mounting portion 71 is. The standing wall 65 is arranged with an interval from the right-side mounting portion 71 in the horizontal direction. The standing wall 65 extends downward with a constant width when viewed in the fore-and-aft direction, from a right end portion of the sheet guide portion 55. The standing wall 65 extends in the horizontal direction with a constant thickness when viewed from the lower side. A right end portion of the standing wall 65 is connected to the motor support portion 18. A lower edge of the standing wall 65 extends in the horizontal direction. A front surface of the standing wall 65 is a flat surface continuous to the second guide surface 58 of the sheet guide portion 55 (see FIG. 5). A lower end surface 65*a* of the standing wall 65 is a concave curved surface extending along an outer peripheral surface of the housing 37 of the motor 35. The lower end surface 65*a* extends in the horizontal direction with a constant interval with respect to the outer peripheral surface of the housing 37 of the motor 35.

A small rib 66 is connected to the standing wall 65. The small rib 66 is connected to a left end portion of the standing wall 65. The small rib 66 connects a rear surface of the standing wall 65 and the lower surface of the sheet guide portion 55 to each other. The small rib 66 extends rearward with a constant thickness from the standing wall 65 when viewed from the lower side. A connection part between the small rib 66 and the base portion 11 is located within an area of the sheet guide portion 55. A lower end surface 66*a* of the small rib 66 is continuous to the lower end surface 65*a* of the standing wall 65, and extends along the outer peripheral surface of the housing 37 of the motor 35. The lower end surface 66*a* extends with a substantially constant interval with respect to the outer peripheral surface of the housing 37 of the motor 35.

The ribs 80 are provided between an entirety of the mounting portions 70 and the motor support portion 18. That is, the ribs 80 are provided on the right side of the mounting portions 70. The ribs 80 connect the base portion 11 and protruding portions (the standing wall 65 and the right-side mounting portion 71) protruding from the base portion 11 to each other, respectively. The ribs 80 include a first rib 81 and a second rib 82.

The first rib 81 connects the front surface of the standing wall 65 and a lower surface of the base portion 11 to each other. The first rib 81 is provided closer to the motor support portion 18 than the small rib 66 is. In this embodiment, the first rib 81 is connected to a portion of the standing wall 65, which is on the motor support portion 18 side from a center position of the standing wall 65 in the horizontal direction thereof. The first rib 81 extends rearward with a constant thickness from the standing wall 65 when viewed from the lower side. The first rib 81 is connected continuously to the sheet guide portion 55, the connection portion 60, and the rear plate portion 50. The first rib 81 includes a lower end surface 81*a* extending along the outer peripheral surface of the housing 37 of the motor 35. The lower end surface 81*a* is continuous to the lower end surface 65*a* of the standing wall 65. The lower end surface 81*a* extends with a substantially a constant interval with respect to the outer peripheral surface of the housing 37 of the motor 35.

The second rib 82 connects a right end surface of the right-side fastening portion 73 and the rear surface of the rear plate portion 50 to each other. The second rib 82 is connected to the entire right end surface of the right-side fastening portion 73 in the fore-and-aft direction. The second rib 82 is connected to the rear surface of the rear plate portion 50 over an entire length of the second rib 82 in the horizontal direction thereof. An end surface 82*a* of the second rib 82 extends linearly rightward from the connection portion 60 between the second rib 82 and the right-side fastening portion 73, and then, extends linearly rightward and forward to a right end portion of the second rib 82. The right end portion of the second rib 82 is located at the same position as that of the first rib 81 in the fore-and-aft direction (see FIG. 9). Accordingly, a formation range of the second rib 82 in the horizontal direction overlaps a formation range of the first rib 81 in the horizontal direction. A lower surface of the second rib 82 is formed into a recessed shape. An upper surface of the second rib 82 is a flat surface continuous to the upper surface of the right-side fastening portion 73 (see FIG. 4).

As illustrated in FIG. 7, a conducting member arrangement portion 90 in which the conducting member 45 is to be arranged is formed in the base portion 11. The conducting member arrangement portion 90 is provided closer to the motor support portion 18 than the right-side fastening portion 73 is. The conducting member arrangement portion 90 includes a vertical groove 91, a horizontal groove 92, and a slit 93. The vertical groove 91 and the horizontal groove 92 are formed in the rear surface of the rear plate portion 50.

The vertical groove 91 extends in the vertical direction. An upper end portion of the vertical groove 91 communicates with a space in front of the rear plate portion 50 via a through-hole through which the conducting member 45 is to be inserted. The vertical groove 91 is defined by a first wall portion 96A from the right side. The first wall portion 96A extends in the vertical direction with a substantially constant width when viewed from the rear side. With this configuration, a first recessed portion 94 recessed forward is formed on a side opposite to the vertical groove 91 across the first wall portion 96A.

The horizontal groove 92 extends in the horizontal direction. A left end portion of the horizontal groove 92 is connected to a lower end portion of the vertical groove 91. The horizontal groove 92 is defined by a second wall portion 96B from the upper side. The second wall portion 96B extends in the horizontal direction with a substantially constant width when viewed from the rear side. A left end portion of the second wall portion 96B is connected to a lower end portion of the first wall portion 96A. With this configuration, the second wall portion 96B defines the first recessed portion 94 from the lower side. A first reinforcement wall portion 97 defining the first recessed portion 94 from the right side is connected to the second wall portion 96B. The first reinforcement wall portion 97 extends upward from a right end portion of the second wall portion 96B.

The horizontal groove 92 is defined by a third wall portion 96C from the lower side. The third wall portion 96C extends in the horizontal direction with a substantially constant width when viewed from the rear side. With this configuration, a second recessed portion 95 recessed forward is formed on a side opposite to the horizontal groove 92 across the third wall portion 96C. The second recessed portion 95 is defined by the second rib 82 from the lower side. A second reinforcement wall portion 98 defining the second recessed portion 95 from the right side is connected to the third wall portion 96C. The second reinforcement wall portion 98 extends downward from the third wall portion 96C, and then, is connected to the first rib 81.

As illustrated in FIG. 7 and FIG. 9, the slit 93 is cut forward from the rear surface of the rear plate portion 50. The cutting of the slit 93 extends through the connection portion 60 to the sheet guide portion 55. The slit 93 extends in the vertical direction when viewed from the rear side. The slit 93 is connected to a right end portion of the horizontal groove 92. The slit 93 is opened to the lower surface of the base portion 11 between the motor support portion 18 and the first rib 81. In the lower surface of the base portion 11, the slit 93 is opened from the rear plate portion 50 to the sheet guide portion 55. In the slit 93, a meandering portion of the conducting member 45 extends vertically while meandering in the fore-and-aft direction. The meandering portion is compressed in the vertical direction in the slit 93. A lower end portion of the meandering portion is brought into press contact with the housing 37 of the motor 35. An upper end portion of the meandering portion is connected to a portion of the elastic member 32, which extends along the horizontal groove 92 and the vertical groove 91.

As described above, in this embodiment, the base portion 11 of the frame 10 includes the first guide surface 57 configured to guide the recording sheet P toward the thermal head 25, and the first guide surface 57 is inclined with respect to the normal direction of the head surface 26 of the thermal head 25. Thus, compared to a configuration in which the guide surface extends along the normal direction of the head surface of the thermal head, a sectional area of a transverse section of the base portion 11 is reduced, and hence, rigidity of the base portion 11 is reduced accordingly.

In view of the above, the frame 10 according to this embodiment is provided with the right-side fastening portion 73 and the standing wall 65 each protruding from the base portion 11; and the ribs 80 provided between the motor support portion 18 and the mounting portions 70 and extending so as to connect the base portion 11 and each of the right-side fastening portion 73 and the standing wall 65. According to this configuration, the right-side fastening portion 73 and the standing wall 65 are firmly connected to the base portion 11. Thus, a portion of the base portion 11 between the motor support portion 18 and the mounting portions 70 can be reinforced by the right-side fastening portion 73, the standing wall 65, and the ribs 80. As a result, when a drop impact is applied, with the mounting portions 70 fixed to the casing 3 of the portable terminal 1 as a fulcrum, so that the motor support portion 18 supporting the motor 35 being a heavy component swings, breakage of the portion of the base portion 11 between the motor support portion 18 and the mounting portions 70 can be suppressed. Accordingly, it is possible to provide the printing unit 6 having excellent durability against the drop impact.

Further, the standing wall 65 is connected to the motor support portion 18. According to this configuration, a load applied to the motor support portion 18 can be received by not only the base portion 11 but also the standing wall 65. Due to being connected to the first rib 81, the standing wall 65 is hard to be displaced relative to the base portion 11, and hence, when the drop impact is applied, the breakage of the portion of the base portion 11 between the motor support portion 18 and the mounting portions 70 can be more reliably suppressed.

The second rib 82 is connected to the right-side fastening portion 73 which is one of the mounting portions 70. According to this configuration, a load applied from the motor support portion 18 to the base portion 11 can be transmitted not only to a connection part between the base portion 11 and the right-side fastening portion 73 but also to the right-side fastening portion 73 via the second rib 82. With this configuration, stress concentration is suppressed from occurring on the connection part between the base portion 11 and the right-side fastening portion 73. Thus, when the drop impact is applied, the breakage of the portion of the base portion 11 between the motor support portion 18 and the right-side fastening portion 73 can be more reliably suppressed.

The right-side fastening portion 73 is fastened to the casing 3. According to this configuration, the right-side fastening portion 73 is non-displaceable relative to the casing 3, and hence, a load transmitted from the motor support portion 18 to the right-side fastening portion 73 via the base portion 11 is hard to be released, and the stress concentration is liable to occur on the connection part between the base portion 11 and the right-side fastening portion 73. Accordingly, the effects described above can be achieved more effectively by providing the second rib 82 which extends so as to connect the right-side fastening portion 73 and the base portion 11 to each other.

The right-side mounting portion 71 is provided closer to the motor support portion 18 than the left-side mounting portion 76 is. In this case, when the drop impact is applied so that the motor support portion 18 swings, the frame 10 is deformed such that the right-side mounting portion 71 closer to the motor support portion 18 serves as a fulcrum, the motor support portion 18 serves as a point of force, and a portion of the base portion 11 between the right-side mounting portion 71 and the left-side mounting portion 76 serves as a point of action. That is, a load of the motor support portion 18 is transmitted to the frame 10 so as to deflect the portion of the base portion 11 between the right-side mounting portion 71 and the left-side mounting portion 76. At this time, in a case in which the base portion 11 is formed to be hard to be deflected, stress concentration occurs on a specific portion such as a recessed portion in the base portion 11 so that cracks may be easily caused thereon.

In this embodiment, the left-side mounting portion 76 is provided at the end portion of the frame 10, which is on the side opposite to the motor support portion 18 with respect to the right-side mounting portion 71. According to this configuration, compared to a configuration in which the left-side mounting portion 76 is not provided at the end portion of the frame 10, a portion of the base portion 11 can be formed longer in the horizontal direction between the right-side mounting portion 71 and the left-side mounting portion 76. As a result, the entire portion of the base portion 11 between the right-side mounting portion 71 and the left-side mounting portion 76 is easily deflected. Thus, the load of the motor support portion 18 transmitted to the portion of the base portion 11 between the right-side mounting portion 71 and the left-side mounting portion 76 can be dispersed in a wider range of the frame 10 in the horizontal direction. Accordingly, breakage of the portion of the base portion 11 between the right-side mounting portion 71 and the left-side mounting portion 76 can be suppressed.

The inclination angle of the first guide surface 57 with respect to the normal direction of the head surface 26 of the thermal head 25 is 45° or more and 60° or less. With this configuration, when the recording sheet P is guided toward the thermal head 25, even under a specific temperature condition in which adhesiveness of a label being the recording sheet P is degraded, removal of the label can be prevented.

Further, the portable terminal 1 according to this embodiment includes the printing unit 6, and thus, can serve as a printer having excellent durability against the drop impact.

Note that, the present invention is not limited to the embodiment described above with reference to the drawings, and various modification examples may be employed within the technical scope of the present invention.

For example, in the above-mentioned embodiment, the motor 35 is arranged below the base portion 11 of the frame 10, but arrangement of the motor is not particularly limited, and arrangement of the motor support portion can also be changed appropriately in accordance with a position of the motor.

In the above-mentioned embodiment, the motor 35 is bonded to the motor support portion 18 of the frame 10, but a method of fixing the motor is not particularly limited. For example, the motor may be fastened to the motor support portion.

In the above-mentioned embodiment, the right-side fastening portion 73 and the standing wall 65 are provided as the protruding portions of the frame 10, but the number of the protruding portions is not particularly limited. Further, in a case in which a plurality of protruding portions protruding from the base portion are provided between the motor support portion and the mounting portions, it is only required that a lib be connected to at least one of the plurality of protruding portions.

Besides the above, the components in the above-mentioned embodiment may be replaced by well-known components as appropriate without departing from the gist of the present invention.

What is claimed is:

1. A printing unit, comprising:

a platen roller configured to convey a recording sheet;

a thermal head configured to perform printing on the recording sheet through press contact with an outer peripheral surface of the platen roller;

a motor configured to serve as a drive source of the platen roller; and a frame configured to support the platen roller in a rotatable manner, wherein the frame includes:

a motor support portion configured to support the motor;

a base portion which is connected to the motor support portion, and extends in an axial direction of the platen roller;

mounting portions comprising a right-side mounting portion and a left-side mounting portion which are attached to a member on which the printing unit is to be mounted;

a protruding portion comprising a standing wall which protrudes downward from the base portion, the standing wall being between the right-side mounting portion and the motor support portion; and a rib which is provided between the motor support portion and the mounting portions, so as to connect the standing wall and the base portion to each other, wherein the right-side mounting portion and the left-side mounting portion are arranged with an interval in the axial direction, and the right-side mounting portion is provided closer to the motor support portion than the left-side mounting portion, wherein the base portion includes a guide surface configured to guide the recording sheet toward the thermal head, and wherein the guide surface is inclined with respect to a normal direction of a head surface of the thermal head.

2. The printing unit according to claim 1, wherein the protruding portion is connected to the motor support portion.

3. The printing unit according to claim 1, wherein the protruding portion is one of the mounting portions.

4. The printing unit according to claim 3, wherein the mounting portions are fastened to the member on which the printing unit is to be mounted.

5. The printing unit according to claim 1, wherein the left-side mounting portion is provided at an end portion of the frame, which is on a side opposite to the motor support portion with respect to the right-side mounting portion.

6. The printing unit according to claim 1, wherein an inclination angle of the guide surface with respect to the normal direction of the head surface of the thermal head is 45° or more and 60° or less.

7. A portable terminal, comprising the printing unit of claim 1.

* * * * *